United States Patent Office 3,449,339
Patented June 10, 1969

3,449,339
POLYMERIC COMPLEXES OF SACCHARIN AND CYCLOHEXANESULFAMIC ACID
Wilhelm E. Walles, Midland, Mich., assignor to The Dow Chemical Company, Midland, Mich., a corporation of Delaware
No Drawing. Continuation-in-part of application Ser. No. 12,254, Mar. 2, 1960. This application Aug. 19, 1966, Ser. No. 573,488
Int. Cl. C07d 85/44, 87/00; A23l 1/26
U.S. Cl. 260—244                    1 Claim

ABSTRACT OF THE DISCLOSURE

Saccharin or cyclamate or a mixture of them, in the acid or salt form, is combined with a cyclic carbamate such as a polyvinyl oxazolidinone to obtain a stable resonance complex of improved properties as a sweetening agent.

---

Description of the invention

This is a continuation-in-part of application Ser. No. 12,254, filed Mar. 2, 1960.

According to the present invention I have invented certain novel complexes possessing remarkable stability. All the present complexes have, in common, the property that each of them comprises, as one member of the complex, a cyclic carbamate compound, and as the other member another organic compound comprising at least a cation, that is to say, an electropositive moiety, and a negative organic radical.

The known noun *complex* is used herein in strict accord with one of its known meanings, to designate, in a generic or specific sense, a composition of matter such as those of the present invention; a substance composed of separate molecules bonded together by forces not so strong as conventional covalent bonds but stronger than hydrogen bonding, and strong enough that not only are the present complexes stable under ordinary conditions of preparation, storage, and employment, but also they confer stability on the behaviour of their members.

The bonding of the present complexes arises when candidate substances to become members of the complex are brought into contact one with another, and occurs without addition to or subtraction from any compound of any atom.

The noun *complectant* is used generically to designate a molecular chemical substance which may be caused to unite with a compound comprising a cationic, that is to say, an electropositive moiety and a negative organic group in preparation of the present complexes. The complectant is, in general, the material whose properties have been observed to have the greater effect (of the effects of at least two kinds of components of the resulting complex) upon the solubility, stability, physical state, and many other physical properties of the said complex, and is common to many different kinds of complex. All the present complectants are cyclic carbamate compounds.

The noun *complectate* is used in the present specification and claims to designate an organic chemical substance other than the complectant, a molecule of which comprises at least a cation, that is to say a positive moiety, and a negative group, which unites with the complectant in the preparation of the present complexes; the complectate is the material whose properties have frequently been observed to have the greater effect (of the effects of the two kinds of members of the resulting complex) upon many chemical and particularly biochemical properties of the complex. The properties of complectates are dependably stabilized. Volatility, if any, is suppressed. Toxicity is reduced. Routine chemical reactivity is not affected.

In view of these definitions, the present invention relates to novel complexes of which the complectants are cyclic carbamate compounds of which oxazolidinone and oxazinidinone are representative, and designated by the formula

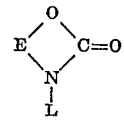

wherein O is the symbol for oxygen, C is the symbol for carbon, N is the symbol for nitrogen, the foregoing being conventional symbols, and wherein E represents a divalent group which, in every occurrence, introduces either two or three carbon atoms at the indicated heterocyclic ring site between nitrogen and oxygen, and may be ethylene (dimethylene), trimethylene, methylethylene (isopropylene), 1,2-dimethylethylene (2,3-n-butylene), 1,3-amylene, 2,3-amylene, 2,4-amylene, 1,2-hexylene, 2,4-hexylene, 2,3-hexylene, 3,4-hexylene; cyclohexyl ethylene; phenylethylene, 1-phenyl-1,3-propylene, 1 - phenyl-1,2-propylene, (p-tolyl)ethylene, 2-(o-tolyl)-1,3-trimethylene, 4-bromo-1,2-phenylene, and 4-iodo-1,2-phenylene.

L is vinyl, allyl, and isopropenyl.

By known addition polymerization of vinyl, allyl, or isopropenyl, L can become a group

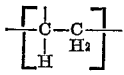

or

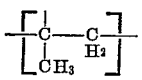

or

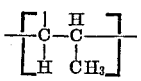

and the resulting compounds are polymers upon each second carbon of which recurs a group

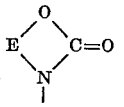

The polymers are typically of K-values according to Fikentscher of from about 2 to about 200.

The complectates are organic compounds containing hydrogen attached to a negative, that is to say, an anionic organic group. The negative or anionic organic groups are those generally recognized by chemists, for example as defined in Hackh's Chemical Dictionary by Grant (McGraw-Hill Book Company, New York, 3rd edition, 1944) p. 565, see "negative group," second meaning. Within the scope of the definition, the negative groups to be employed are those which exclude inorganic groups.

More particularly, a complectate to be employed in the present invention is a compound of the formula $$Q_n—G—R$$

In this general formula, Q represents hydrogen or, by dissociation as in water, an electron remaining with the dissociated ion, as when the proton of hydrogen exists temporarily in isolation.

Further, in this formula, $n$ represents the valency of G with respect to Q.

In certain of the present complectates, the compound is best understood when G and R are taken together. In such compounds, these two moieties taken together can represent

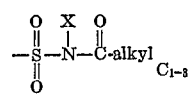

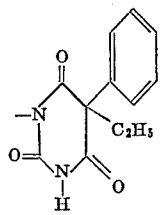

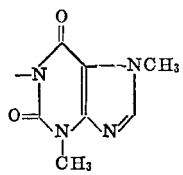

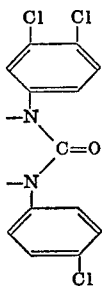

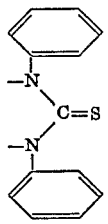

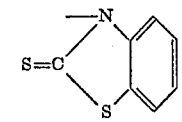

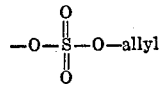

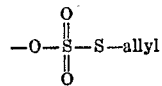

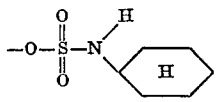

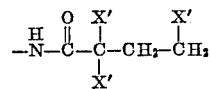

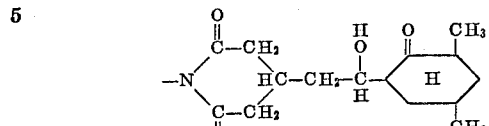

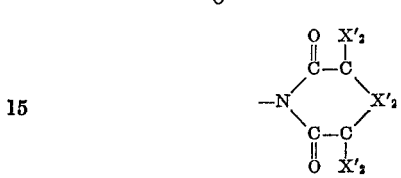

—N—CO—NH—CO—CO—

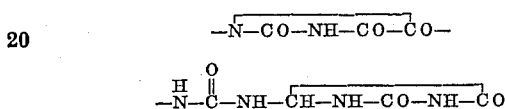

—N(CONH$_2$)$_2$

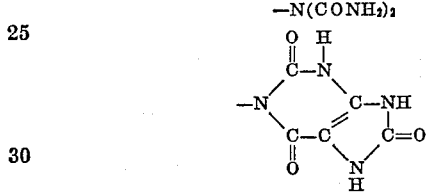

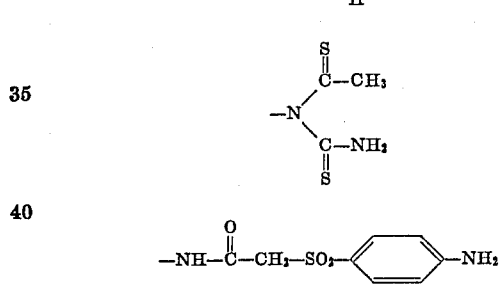

—NH—C(O)—CH$_2$—SO$_2$—⟨phenyl⟩—NH$_2$

No byproduct is formed as a result of preparation of the instant complexes. By the employment of stoichiometric amounts of pure starting materials it is possible to prepare the present complexes in pure form. If the complectant be employed in excess, a resulting pure but unsatisfied complex will be prepared. If complectate be employed in excess, a resulting complex impure by reason of surplus complectate will be prepared. In the latter instance, employment of further complectant wherewith to prepare further complex binds the excess complectate, obviating need for other means of purification.

The utilities of the present complexes are, in general, control of solubility and dispersibility of bound substances in a variety of solvents and non-solvent media, making possible exhibition of desirable properties deriving from the complectate but not otherwise available; in a wide range of applications the complexes exhibit useful biological properties deriving from the complectates but greatly attenuated undesired toxic properties of the complectates. Many of the complexes exhibit the useful properties but almost none of the vapor pressure of vapor-producing complectates. The complexes have wide application in chemical purification, extraction, and synthesis. Complexes of good stability are prepared comprising complectates which are chemically unstable; but such complexes usually exhibit desired properties such as biological activities of the complectate. Other useful properties are apparent in the following portions of the present specification.

The complectant materials to be employed according to the present invention, including many of the nonpolymeric materials, are readily prepared according to the following general reaction.

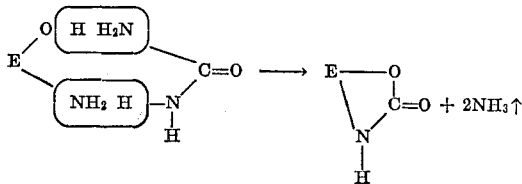

wherein E has the values hereinbefore set forth. By the choice of appropriate starting materials, a choice which, in view of the present teaching, lies readily within the skill of chemists, it is possible to prepare oxazolidinones and substituted oxazolidinones of an extremely wide range.

When it is desired to prepare a cyclic carbamate material the structure of which can be accurately predicted from the identity of the starting materials, the aminoalkanol material to be reacted with urea should, preferably, contain only one hydroxyl group; when only one such hydroxyl group is present the reaction follows the course indicated in the foregoing general reaction. When however, there is employed an amino alkanol material containing more than one hydroxyl group, ring closure and resulting formation of a cyclic carbamate may occur between the urea moiety and the amino alkanol moiety involving one, or, as the case may be, the other hydroxyl site. Thus, various reaction products of uncertain identity may be prepared. However, the reactions of two aminodiols have been studied, and they may be employed with confidence. When the starting aminoalkanol compound is 4-amino-1,3-butanediol, the resulting compound is 5-hydroxyethyl-oxazolidin-2-one. When the starting compound is 2-amino-1,4-butanediol, the resulting compound is 4-hydroxyethyloxazolidin-2-one. Either of the said hydroxyethyl oxazolidinones may be dehydrated, as by heating gently in the presence of phosphorus pentoxide ($P_2O_5$) at temperatures in the general range of 50° to 100° and preferably 60° to 70° C. in an inert solvent such as dioxane, pyridine, or the like whereby the hydroxyethyl group, being dehydrated, yields a vinyl group as substituent on the said position of the oxazolidinone ring. In an alternative procedure, the oxazolidinone not bearing a substituent upon the ring nitrogen atom may be reacted with an alkenyl alkyl ether in dimethyl formamide solvent and in the presence of mercuric acetate catalyst in a known trans-alkenylation reaction whereby to introduce, as substituent upon the ring nitrogen of oxazolidinone, or oxazinadinone, an alkenyl substituent.

Complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutylronitrile), at a temperature in the range of from 50° to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90°C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The present complectants and, correspondingly, the present complexes may readily be formed into desired shapes and sizes. Such forming is, in general, readily effected by the simple means of subjecting the complectants or complex in granular or pulverulene form to a formative pressure in such known procedures as tableting and the like.

Example 1.—Double complex of 2,3-dihydro-3-oxobenziso sulfonazole and bis(2-ethylhexyl)ester of sodium sulfosuccinate As is more fully set forth hereinafter, the compound 2,3-dihydro-3-oxobenzisosulfonazole and its salts form complexes according to the present invention. The acceptability of these complexes as non-nutritive sweetening agents is diminished somewhat in some applications by the thermosensitivity of the solubility of the said complex. For example, at concentrations which might ordinarily be employed in the sweetening of beverages, solutions of a complex of the sulfonazoloxazolidine type alone are clear at temperatures up to about 35° C. At temperatures near to this lower limit temperature solutions of the said complex tend to become cloudy representing a change of solubility of the complex without change in its component composition. Although it retains its sweetening power and remains stably dispersed (that is to say no precipitate settles out upon prolonged standing in this form) its appearance is objectionable for many applications. The incipient cloudiness becomes more prominent as the temperature is raised to about 48°, corresponding to a lower limit temperature at which so called "hot" beverages are commonly ingested. At such normal ingestion temperatures the said complex solution achieves a maximum cloudiness, imparting a distinctly hazy appearance to beverages thus sweetened.

Therefore, numerous double-complexes were prepared using the said complectant and, in addition to the said complectate, various surfactant materials which might confer upon the resulting complexes greater dispersibility or solubility in water. Many of the such surfactant materials meet the present definition for sulfur-containing complectate substances. In the present example, the co-complectate was a commercially available surfactant, chemically a mixture which, in water, provided the bis(2-ethylhexyl) sulfosuccinate ion. The sulfosuccinate moiety conforms to the definition of the instant sub-genus of the negative radicals, and complexes readily in the manner of the present invention.

In preparing the present complex, a complex was first prepared consisting of 2,3-dihydro-3-oxobenzisosulfonazole complected with polymeric 5-methyl-3-vinyl oxazolidin-2-one. This preparation and the resulting product are more fully described hereinafter. The complex is a white, water-soluble substance. To a 0.1 weight percent aqueous solution of the said complex was added an aqueous solution of the surfactant in a quantity sufficient to introduce 0.5 percent of sulfosuccinate by weight of the resulting solution. A complex promptly formed without conventional chemical reaction. The resulting product was soluble as a clear solution in aqueous preparations at all temperatures between the freezing point and boiling point of the said preparations.

Complexes of the present invention whereof the complectate was saccharin were prepared and studied in detail. Not only do such complexes represent a valuable and obviously useful embodiment of the present invention, but they establish that the necessary complectate structure is not disturbed by being bonded as a heterocyclic moiety. Thus the present complexes strongly confirm that the electronic structure of certain moieties or portions of the complectate molecule is critical but that the further structure of the complectate is virtually without effect upon the operability of a complectate.

Example 2.—Complex of saccharin and
N-ethyl-5-methyl-2-oxazolidinone

To a total of 29 grams of N-ethyl-5-methyl-2-oxazolidinone (a liquid at room temperature) was added 1 gram dry granular 2,3-dihydro-3-oxobenzisosulfonazole compound, commonly known as saccharin. The dispersion was heated gently to a temperature of 60° C. During the heating, the saccharin disappeared as the complex formed. The resulting preparation was then cooled to room temperature, approximately 20° C., and at such temperature remained pellucid. Thereafter, the preparation was chilled to 1° C. to ascertain whether, at such temperature the saccharin would precipitate as a crystalline material. No precipitate formed, but the preparation remained completely clear. The infrared spectrum of the resulting preparation confirmed the identity of the complex of saccharin and N-ethyl-5-methyl-2-oxazolidinone.

In a second preparation, the same procedure is carried out except that the complectant is heated to 125° C. prior to addition of sodium saccharin. The complex is formed quickly as a pellucid liquid which remains clear as the complex is cooled to room temperature.

In yet another preparation, formation of the present complex is carried out at 0° C. At such temperature which is approximately 11.5° above the freezing temperature of the complectant, the complecting action takes place slowly, and stirring and agitation are continued during a period of 24 hours. Formation of the desired complex is indicated by the disappearance, in the said mixture, of the granular saccharin material.

Example 3.—Preparation of a solid complex of saccaharin and polymeric 5-methyl-3-vinyl-oxazolidinone One hundred grams of a 10 percent aqueous solution of saccharin was added to 34 grams of a 35 weight percent aqueous solution of polymeric 5-methyl-3-vinyl oxazolidin-2-one having an average molecular weight of approximately 150,000. The resulting mixture was thoroughly stirred at room temperature for a few minutes to obtain a clear aqueous solution of the complex of polymeric 5-methyl-3-vinyl oxazolidin-2-one with saccharin. The solution was drum-dried to obtain a white, solid, non-crystalline complex product. This product was readily soluble in water and was adapted to be used as a non-nutritive sweetening agent.

In one experimental procedure saccharin complex was prepared and air-dried. The complex was a white powder which was found, upon analysis, to comprise 32 weight percent of saccharin complexed with 62 weight percent of the polymeric material and comprising, in the apparently dry form, 6 weight percent of water. In contrast to saccharin alone, the complex was found to be sweet without bitterness or objectionable aftertaste, and adapted to sweeten carbonated soft drinks or fruits. In either cold or hot water or aqueous preparations, the said product was sufficiently soluble to impart any desired sweetness of taste.

Example 4

The present example is carried out as was Example 3 except that, in preparing the complex, there is employed 10 milliliters of one weight percent aqueous N-cyclohexyl sulfamate, 10 grams of a 35 weight percent aqueous solution of polymeric 5-methyl-3-vinyloxazolidin-2-one. The resulting aqueous complex solution is drum dried and reduced to a fine powder to obtain a fine complex of polymeric 5-methyl-3-vinyl-oxazolidin-2-one and N-cyclohexyl sulfamate as a highly water-soluble powder having a distinctive and pleasant sweet taste.

Example 5.—Complex of saccharin with polymeric
3-vinyl 6-methyl oxazinidin-2-one The present example is carried out in all respects as was Example 3 except that, as complectant, the present example employs polymeric 3-vinyl-6-methyl oxazinidin-2-one. The resulting product is found to be a white, noncrystalline solid readily soluble in hot aqueous preparations.

Example 6

The present example is carried out as was Example 3 except that, in preparing the complex, there is employed 10 milliliters of 1 weight percent aqueous N-cyclohexyl sulfamate, 10 grams of a 35 weight percent aqueous solution of polymeric 5-methyl-3-vinyloxazolidin-2-one, in an acidification step, 0.6 milliliter normal sulfuric acid. The washed and air-dried product is a white, granular, unsatisfied complex product readily soluble in aqueous preparations, having a noticeably acid flavour, and a sweetness per unit weight of the same general order as sucrose.

Example 7.—Complex of saccharin with a copolymer of
5-methyl-3-vinyloxazolidin-2-one and styrene The present complectant is a copolymer made from 15 molar proportions of styrene and 85 molar proportions of 5-methyl-3-vinyloxazolidin-2-one. The complectant is a white, finely divided, granular material readily soluble in ethanol. The average molecular weight of the polymer, for each cyclic carbamate unit present, is 123.6.

A dry mixture containing 124 grams of the said copolymer of 5-methyl-3-vinyloxazolidin-2-one with styrene and 103 grams (½ mole) saccharin is added with mixing and stirring to 500 milliliters of warm 95 percent ethanol. These solids promptly dissolve and disappear in the ethanol with the resulting formation of the desired complex. Formation of the complex is indicated by, among other things, an ultra-violet fluorescence spectrum different from the combined fluorescence spectra of the starting materials, and the fact that freezing point depression studies indicate dispersion in the ethanol of a number of particles corresponding approximately to the expected number of complectant molecules but not so great as the number of carbamate moieties thereof or correspondingly, the number of complectate molecules.

Example 8.—ARTIFICIALLY SWEETENED
ALCOHOLIC CORDIAL

A flavoring essence derived primarily from seeds, stems, and roots of umbelliferous plants, principally anise (*Pimpinella anisum*) and dill (*Anethum graveolens*) together with minor amounts of oil of coriander (*Coriandrum sativum*) and stem and root of angelica (*Angelica archangelica*) is combined with a syrup containing a sweetening syrup of which the sweet flavor is derived from a complex of saccharin and polymeric 3-vinyl-5-methyloxazolidin-2-one, slightly thickened with gum acacia. The resultant intensely sweet highly flavored concentrate syrup is diluted with alcohol and water and thereafter artificially colored by the addition of small amounts of soluble chlorophyll to obtain an artificially sweetened, sugar-free herb-flavored alcoholic cordial. The water and alcohol are added in such amounts as to provide a cordial containing alcohol in the amount of approximately 30 percent by weight of alcohol-water mixture.

The complexes comprising 2,3-dihydro-3-oxo-benzisosulfonazole (saccharin) and N-cyclohexyl sulfamic acid or their ionic forms are useful in various applications in which sweetening agents, and in particular non-nutritive sweetening agents are known to be useful. They may be employed as sweetening agents in beverages. The solubility of such complex may be controlled primarily according to the structure and solubility of the complectant. The sweetness of either the complex or the preparation in which it is employed may be controlled by the amount of complex employed and the degree of satisfaction thereof as well as the identity of the complectate. The complexes may be employed as appetitive agents in livestock feeds, therein replacing such known but fermentation-prone sweetening agents as sucrose, molasses, and the like; the complexes may be employed as satients to reduce the feeling of hunger or appetite without contributing nutriment; they may be used as masking agents for unpleasant flavors and in a great many other ways known of sweetening agents generally. The unsatisfied such complexes may be further co-complexed with other complectates having desired properties, to obtain bodying, flavoring, medicating, and like effects.

I claim:

1. A complex which is the product of contacting a compound of the formula

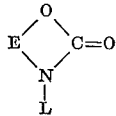

wherein O is the symbol for oxygen, C is the symbol for carbon, N is the symbol for nitrogen, and wherein E represents a divalent moiety selected from ethylene, trimethylene, methylethylene, 1,2 - dimethylethylene, 1,3-amylene, 2,3 - amylene, 2,4 - amylene, 1,2 - hexylene, 2,4-hexylene, 2,3-hexylene, 3,4-hexylene; cyclohexylethylene, phenylethylene, 1-phenyl - 1,3 - propylene, 1-phenyl-1,2-propylene, (p-tolyl)ethylene, 2-(o-tolyl)-1,3-trimethylene.

L is a group

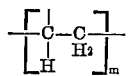

or

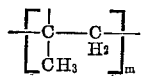

or

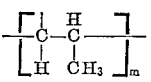

in each of which $m$ is an integer of at least 5 and the resulting compounds are polymers upon an average of about each second carbon of which recurs a group

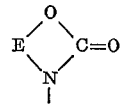

with a compound selected from the group consisting of saccharin or cyclohexane sulfamic acid or the sodium or calcium salts thereof, or mixtures of the same.

References Cited

UNITED STATES PATENTS 2,946,773  7/1960  Walles et al. _____ 260—77.5
2,948,708  8/1960  Walles et al. _____ 260—77.5

OTHER REFERENCES

Marvel et al., J. Am. Pharm. Assoc. (Sci. ed.) 49, 417–19 (1960).

Kennon et al., J. Pharm. Sci. 51, 1149–51 (1962).

WILLIAM H. SHORT, *Primary Examiner.*

M. GOLDSTEIN, *Assistant Examiner.*

U.S. Cl. X.R.

99—30, 141, 142; 260—77.5, 79.3, 88.3, 301, 307, 513.6